United States Patent
Watanabe et al.

(10) Patent No.: US 7,553,884 B2
(45) Date of Patent: *Jun. 30, 2009

(54) INK SET FOR USE IN INK-JET RECORDING, INK-JET RECORDING PROCESS, RECORDING UNIT AND INK-JET RECORDING APPARATUS

(75) Inventors: Kohei Watanabe, Chofu (JP); Takeshi Okada, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

This patent is subject to a terminal disclaimer.

(21) Appl. No.: 11/220,179

(22) Filed: Sep. 6, 2005

(65) Prior Publication Data

US 2006/0052481 A1 Mar. 9, 2006

(30) Foreign Application Priority Data

Sep. 6, 2004 (JP) .............................. 2004-258696

(51) Int. Cl.
*C09D 11/00* (2006.01)
(52) U.S. Cl. ........................ 523/160; 106/31.6; 347/56; 347/86
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| 5,085,698 | A | | 2/1992 | Ma et al. | |
|---|---|---|---|---|---|
| 5,221,334 | A | | 6/1993 | Ma et al. | |
| 5,519,085 | A | * | 5/1996 | Ma et al. | 524/503 |
| 6,454,844 | B1 | * | 9/2002 | Kanaya | 106/31.48 |
| 6,455,628 | B1 | * | 9/2002 | Ma et al. | 524/505 |
| 6,767,090 | B2 | * | 7/2004 | Yatake et al. | 347/100 |
| 6,877,851 | B2 | * | 4/2005 | Watanabe | 347/100 |
| 6,982,290 | B2 | * | 1/2006 | Nakano | 523/160 |
| 7,151,156 | B2 | * | 12/2006 | Sato et al. | 528/86 |
| 2004/0020406 | A1 | | 2/2004 | Kato | |

(Continued)

FOREIGN PATENT DOCUMENTS

JP 56-147871 A 11/1981

*Primary Examiner*—David Wu
*Assistant Examiner*—Vu Nguyen
(74) *Attorney, Agent, or Firm*—Rossi, Kimms & McDowewll, LLP

(57) ABSTRACT

Disclosed herein is an ink set for use in ink-jet recording, which comprises at least 2 ink compositions the solid content concentrations of which are different by more than 2% by mass. The said at least 2 ink compositions each comprise an aqueous medium, a pigment and a dispersant for dispersing the pigment, and the dispersant is a block copolymer having an A segment that is a hydrophobic segment, a B segment that is an oxyethylene-structure-containing nonionic hydrophilic segment, and a C segment that is an ionic hydrophilic segment. The ratio of the number of unit structures of the A segment to the number of oxyethylene structures contained in the B segment (the number of unit structures of the A segment/the number of oxyethylene structures contained in the B segment) of the block copolymer contained in each of said at least 2 ink compositions is higher in the block copolymer contained in the ink composition having a relatively high solid content concentration than in the block copolymer contained in the ink composition having a relatively low solid content concentration.

13 Claims, 3 Drawing Sheets

U.S. PATENT DOCUMENTS

2004/0239738 A1    12/2004  Watanabe
2005/0033010 A1*    2/2005  Sato et al. .................... 528/80
2006/0058422 A1*    3/2006  Okada et al. ................ 523/160

* cited by examiner

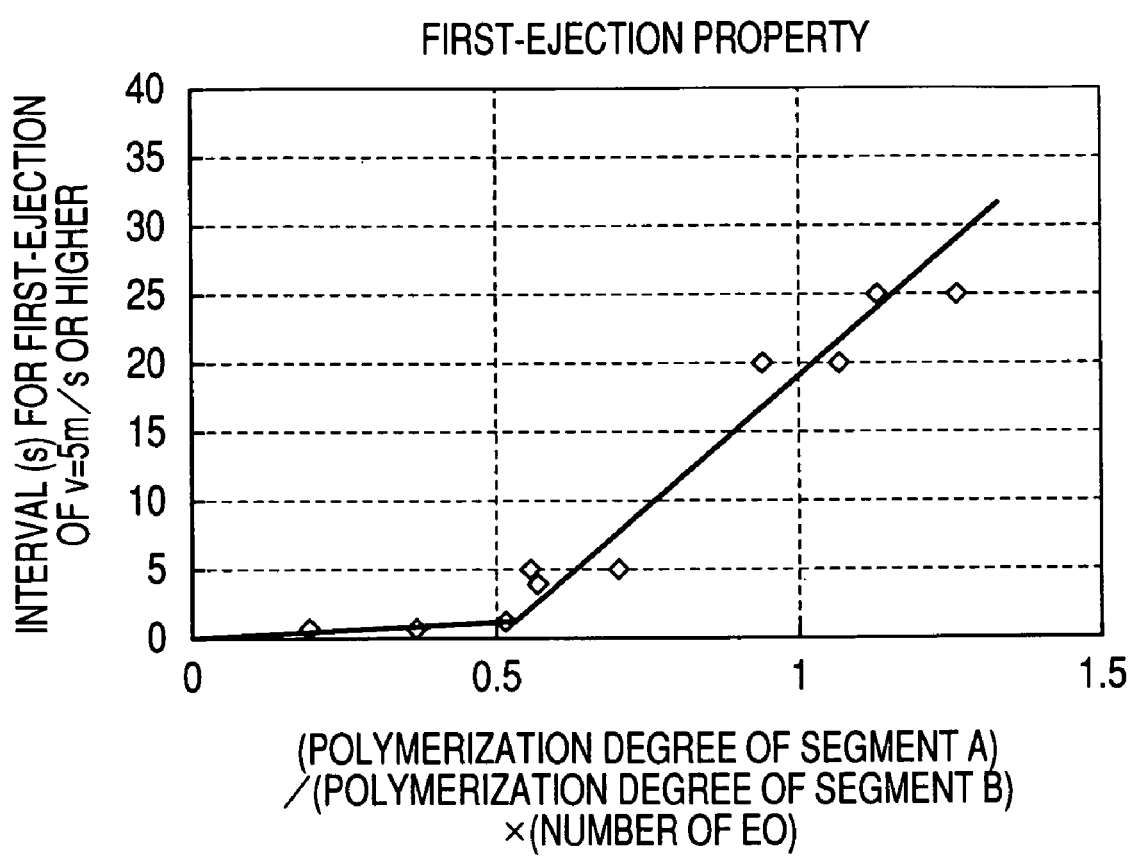

INK SET FOR USE IN INK-JET RECORDING, INK-JET RECORDING PROCESS, RECORDING UNIT AND INK-JET RECORDING APPARATUS

BACKGROUND OF THE INVENTION

1. Field of the Invention

The present invention relates to an ink set for use in ink-jet recording, which is particularly suitable for use in ink-jet recording, an ink-jet recording process, an ink cartridge, a recording unit and a recording apparatus.

2. Related Background Art

An ink-jet recording method is a method that recording is conducted by applying energy to an ink to eject minute droplets of the ink from a nozzle, thereby applying the ink to a recording medium such as paper.

In recent years, the size of an ink droplet ejected from a single nozzle has come to be made smaller for providing an ink-jet recorded image corresponding to an ink-jet recorded image of extremely high quality at silver salt photograph level. Ink-jet printers, the amount of an ink droplet ejected from which is 10 pl (picoliters) or smaller, are currently marketed. With respect to recording speed as well, still more speeding-up is required. Attending on this requirement, it is of urgent necessity for printers to meet a higher drive frequency.

Ink-jet recorded images have recently been required to have not only high definition, but also far excellent fastness properties (light fastness and the like). Therefore, colorants are going to be changed from dyes to pigments. For example, a recording liquid containing an aqueous medium comprising a pigment, a polymer dispersant and a nonionic surfactant is proposed in Japanese Patent Application Laid-Open No. 56-147871. It is also proposed in U.S. Pat. Nos. 5,221,334 and 5,085,698 to use, as a dispersant for pigments, a block copolymer having a hydrophilic segment and a hydrophobic segment.

SUMMARY OF THE INVENTION

The present inventors have confirmed that the use of a block copolymer having a specific structure as a dispersant for pigments is effective for prevention of the so-called solvent shock that granulation of pigment particles takes place when the content of water is reduced. More specifically, it is a block copolymer having an oxyethylene-structure-containing nonionic hydrophilic segment between an ionic hydrophilic segment and a hydrophobic segment.

When ejection of an ink is not conducted for a certain period of time, and a purging operation of nozzles is also not conducted, however, the viscosity of ink in orifices may have been increased due to relative increase in the concentration of the pigment owing to evaporation of water from the tips of the orifices. As a result, such an inconvenience that when a droplet of the ink is intended to be subsequently ejected from the orifice, no ink is ejected or no stable ejection of the ink is conducted to cause defective printing may have arisen. Even when ejection of the ink is normally conducted because the time during which no ejection of the ink is conducted is short, a problem has been offered from the viewpoint of image formation because the pigment in initial several ink droplets has been concentrated to give a higher concentration. In order to provide images of higher quality, many improvements have been still desired under the circumstances.

Hereinafter, ejection of a first droplet of an ink after ejection of the ink is suspended for a certain period of time will be referred to as first-ejection, and when some inconvenience occurs in this first-ejection and ejection of subsequent several droplets, it will be referred to as poor first-ejection property.

The present invention has been made in view of such background art and has as its object the provision of an ink set excellent in first-ejection property.

Another object of the present invention is to provide an ink-jet recording process, which permits the stable formation of images having high quality.

A further object of the present invention is to provide an ink cartridge, a recording unit and a recording apparatus, which can be applied to the ink-jet recording process.

Under the foregoing circumstances, the present inventors have carried out an extensive investigation as to a case where a block polymer having an oxyethylene-structure-containing nonionic hydrophilic segment between an ionic hydrophilic segment and a hydrophobic segment is used as a dispersant for pigments. As a result, it has been found that relative increase in the concentration of a pigment at the tip of an orifice is harder to occur as the ratio of the number of unit structures of the hydrophobic segment to the number of oxyethylene structures becomes higher, so that the first-ejection property becomes good, thus leading to completion of the present invention.

The above objects can be achieved by the present invention described below.

According to the present invention, there is thus provided an ink set for use in ink-jet recording, which comprises at least 2 ink compositions the solid content concentrations of which are different by more than 2% by mass, wherein said at least 2 ink compositions each comprise an aqueous medium, a pigment and a dispersant for dispersing the pigment, and the dispersant is a block copolymer having an A segment that is a hydrophobic segment, a B segment that is an oxyethylene-structure-containing nonionic hydrophilic segment, and a C segment that is an ionic hydrophilic segment, and wherein the ratio of the number of unit structures of the A segment to the number of oxyethylene structures contained in the B segment (the number of unit structures of the A segment/the number of oxyethylene structures contained in the B segment) of the block copolymer contained in each of said at least 2 ink compositions is higher in the block copolymer contained in the ink composition having a relatively high solid content concentration than in the block copolymer contained in the ink composition having a relatively low solid content concentration.

According to the present invention, there is also provided an ink-jet recording process comprises using the above-described ink set for use in ink-jet recording to conduct recording.

According to the present invention, there is further provided an ink cartridge comprising an ink containing portion for containing the above-described ink set for use in ink-jet recording.

According to the present invention, there is still further provided a recording unit comprising the ink cartridge containing the above-described ink set for use in ink-jet recording and an ink-jet head for ejecting the ink compositions.

According to the present invention, there is yet still further provided a recording apparatus comprising the above-described recording unit.

As described above, the ratio of the number of unit structures of the hydrophobic segment to the number of oxyethylene structures in the dispersant is controlled, whereby the ink set is invented, thus leading to completion of the present invention.

According to the present invention, there can be provided an ink set, by which improvement in first-ejection property can be achieved at an extremely high level while retaining the effect of the nonionic hydrophilic segment. In addition, an ink-jet recording process, which permits the stable formation of images having high quality, can be provided. Further, there can be provided an ink cartridge, a recording unit and a recording apparatus, which can be applied to the ink-jet recording process.

BRIEF DESCRIPTION OF THE DRAWINGS

FIG. 3 diagrammatically illustrates the relationship between the ratio of the number of unit structures of the A segment/the number of oxyethylene structures contained in the B segment and time intervals with which re-ejection can be conducted.

DETAILED DESCRIPTION OF THE PREFERRED EMBODIMENTS

Figure 1:
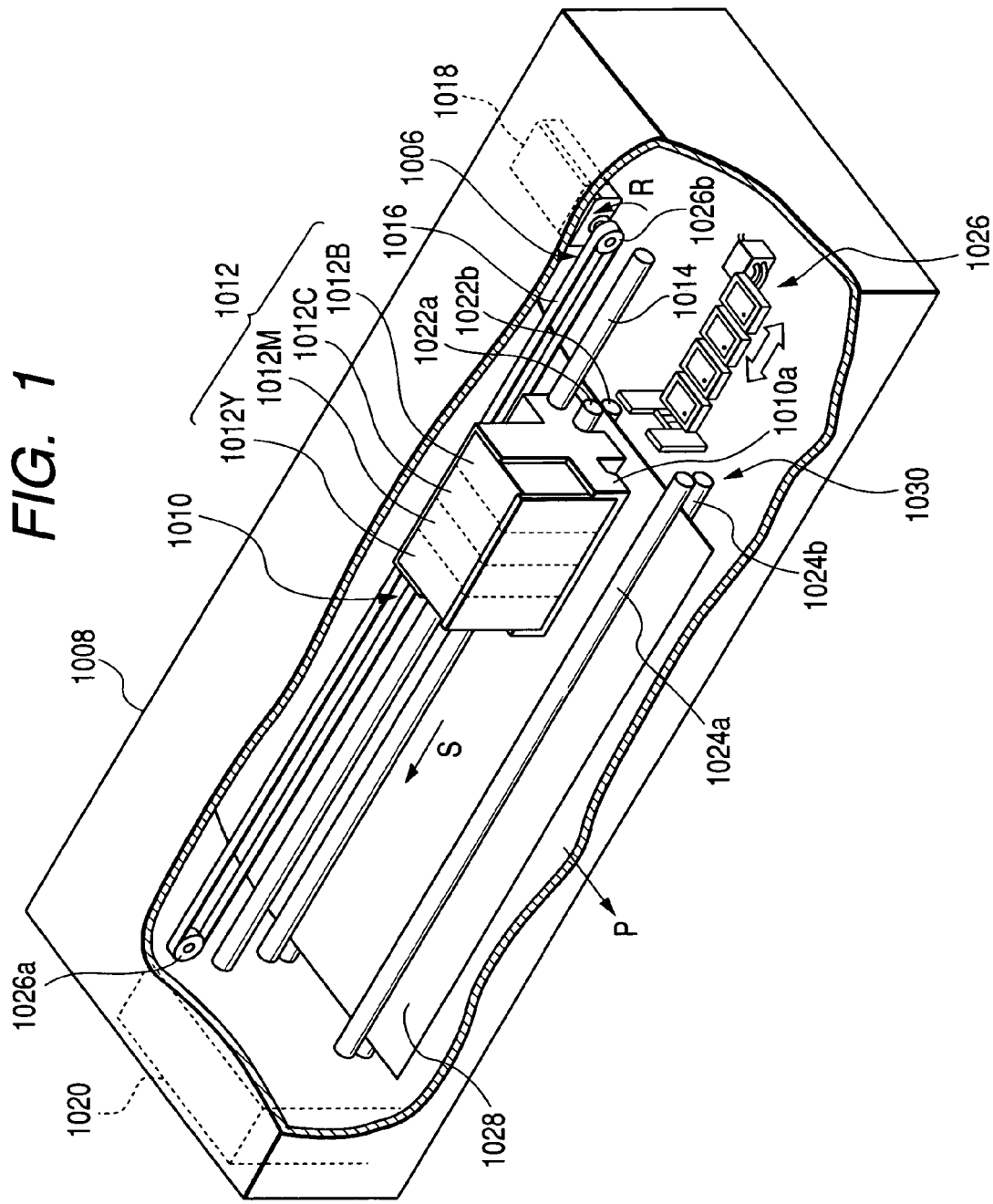
FIG. 1 is a schematic perspective view illustrating principal parts of an exemplary ink-jet printer, in which a liquid-ejecting head can be installed.

The present invention will hereinafter be described in detail by the preferred embodiments.

In the block copolymer used as a dispersant in ink compositions according to the present invention, each segment may be a copolymer segment so far as the block copolymer is a block copolymer having the so-called ABC structure that an A segment is a hydrophobic segment, a B segment is an oxyethylene-structure-containing nonionic hydrophilic segment, and a C segment is an ionic hydrophilic segment. The form of the copolymer is not limited. For example, it may be either a random copolymer or a graduation copolymer that a compositional ratio is gradually changed.

In the present invention, the amphiphilic block copolymer has the B segment, whereby the ink momentarily increases the viscosity at the same time as the penetration of water after the ink impacts on recording paper, so that a phenomenon (color bleeding) that when at least 2 inks overlap each other, the inks mix with each other to make the boundary indefinite is reduced. In addition, the block copolymer has the B segment, whereby the pigment particles rapidly aggregate to uniformly fix without forming any coarse particles even when an organic solvent is present in excess after the impact of the ink, so that the glossiness of the resulting image is improved. The abrasion resistance and water fastness are also improved.

In the ink prepared by using such a dispersant resin, however, re-ejection of the ink may have heretofore been hard to be stably conducted when the ink is ejected from a predetermined nozzle of an ink-jet recording head, the ejection of the ink from this nozzle is suspended for a certain period of time, and the ink is then ejected again from the nozzle. Therefore, inconvenience such as formation of stripe-like unevenness is caused upon the formation of an image. The present inventors have carried out an extensive investigation. As a result, it has been found that this re-ejection property is greatly affected by 2 factors of the solid content concentration of the ink and the ratio of the number of unit structures of the A segment to the number of oxyethylene structures contained in the B segment. In other words, it is known that when no ink is ejected from the tip of an orifice of an ink-jet head for a certain period of time, water evaporates through an opening of the tip of the orifice to increase the solid content concentration to increase the viscosity of the ink, so that subsequent ejection is affected. Such influence markedly appears on an ink having a high solid content concentration by nature. However, it has been found that the ratio of the number of unit structures of the A segment to the number of oxyethylene structures contained in the B segment is made higher, whereby the pigment particles dispersed are moved to a region containing water in a high proportion when the ratio of water and an organic solvent at the tip portion of the orifice is changed due to evaporation of water, so that the increase of viscosity due to the increase of the solid content concentration is prevented to lessen the influence on the subsequent ejection.

Therefore, in the ink set comprising at least 2 ink compositions different in solid content concentration from each other, the ink composition having a relatively high solid content concentration uses, as a dispersant, an amphiphilic block copolymer higher in the ratio of the number of unit structures of the A segment to the number of oxyethylene structures contained in the B segment than the ink composition having a relatively low solid content concentration, whereby both formation of images high in fastness properties and good ejection stability of an ink-jet head can be achieved.

Incidentally, the solid content concentration of the ink composition in the present invention means the proportion of nonvolatile components (for example, ink and dispersant) in the ink composition to the whole mass of the ink composition. The technical problem in the present invention particularly markedly arises when the solid content concentration of the ink composition is 4% by mass or higher.

FIG. 3 diagrammatically illustrates the relationship between the ratio of the number of unit structures of the A segment/the number of oxyethylene structures contained in the B segment and time intervals with which re-ejection can be conducted. More specifically, with respect to cyan inks prepared by respectively using various kinds of polymers different in structure, the ejection speed is measured with intervals put after the ejection is suspended, and time intervals with which ejection can be conducted at an ejection speed of at least 5 mm/s are plotted to give a diagram shown in FIG. 3. As a result, it is understood that the first-ejection property becomes better as the ratio of the number of unit structures of the A segment/the number of oxyethylene structures contained in the B segment increases. The ratio of the number of unit structures of the A segment/the number of oxyethylene structures contained in the B segment is more preferably 0.5 or higher.

Since formation of a color image in ink-jet recording is generally conducted by using at least 3 colors of a yellow ink composition, a magenta ink composition and a cyan ink composition, the block copolymer is suitably applied to an ink set having these 3 color ink compositions. In the ink set of these 3 colors, an optimum solid content concentration in each of the ink compositions is also preset from the viewpoint of color reproduction. In the present invention, at this time, the amphiphilic block copolymer of the dispersant is selected as described above, whereby ejection stability can be improved to form a color image free of defects.

Other ink compositions than the above-described 3 colors may also be used for the purpose of enlarging a color reproduction range and providing an image of high image quality. Specific examples of the ink compositions include color ink compositions of light magenta, light cyan, black, light black, red, green, blue, orange, violet and the like.

The light magenta and light cyan ink compositions described herein generally mean those obtained by respectively lowering the colorant concentrations of the magenta and cyan ink compositions for the purpose of improving the image quality of a printed image by density modulation. At this time, an ink set having ink compositions satisfying the constitution of the present invention for the same colors is used, whereby a color image good in color reproduction can be formed.

The red, orange, green, blue and violet ink compositions are ink compositions used as elements making up intermediate colors of yellow, magenta and cyan for the purpose of improving the color reproduction range. The light black ink composition is that obtained by lowering the colorant concentration of the black ink composition for the purpose of improving color reproduction properties and gradation properties for a dark color of a shadow portion or the like and lowering graininess.

Incidentally, the block copolymer is a copolymer that polymer segments composed of different unit structures are bonded to each other by a covalent bond and is also called a block polymer.

Specific examples of the block copolymer used as a dispersant in the ink compositions according to the present invention include conventionally known block copolymers such as acrylic or methacrylic block copolymers, block copolymers composed of polystyrene and any other addition polymerization system or condensation polymerization system, and block copolymers having polyoxyethylene and polyoxyalkylene blocks. In the present invention, the block copolymer may be a graft copolymer that another polymer is boned in the form of a character T to a certain copolymer chain. The block copolymer according to the present invention preferably contains a polyvinyl ether structure as a unit structure.

Preferable and specific unit structures of the ionic hydrophilic segment (C segment) include repeating units represented by the following general formula (1)

(1)

wherein $R^0$ is —X—(COOH)$_r$, —X—(COO—M)$_r$ or —X—(COO)$_2$M$^2$, X is a linear, branched or cyclic alkanediyl or alkanetriyl group having 1 to 20 carbon atoms, or —(CH(R$^5$)—CH(R$^6$)—O)$_p$—(CH$_2$)$_m$—CH$_{3-r}$—, —(CH$_2$)$_m$—(O)$_n$—(CH$_2$)$_q$—CH$_{3-r}$—, or a group obtained by substituting a carbonyl group or an aromatic ring structure for at least one of the methylene groups thereof or a group obtained by substituting an aromatic ring structure for at least one of the methine groups thereof, r is 1 or 2, p is an integer of from 1 to 18, m is an integer of from 0 to 35, n is 1 or 0, q is an integer of from 0 to 17, M is a monovalent cation, M$^2$ is a divalent cation, and R$^5$ and R$^6$ are alkyl groups and may be the same or different from each other wherein the R$^5$ or R$^6$ groups may be the same or different from each other when a plurality of such groups are present.

Further, preferable and specific unit structures of the hydrophobic segment (A segment) or the oxyethylene-structure-containing nonionic hydrophilic segment (B segment) include repeating units represented by the following general formula (2)

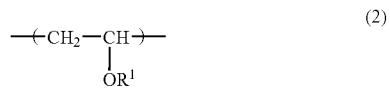

(2)

wherein $R^1$ is selected from a linear, branched or cyclic alkyl group having 1 to 18 carbon atoms, —Ph, —Pyr, —Ph—Ph, —Ph—Pyr, —(CH(R$^5$)—CH(R$^5$)—O)$_p$—R$^7$ and —(CH$_2$)$_m$—(O)$_n$—R$^7$, in which hydrogen bonded to carbon in the aromatic ring may be replaced by a linear or branched alkyl group having 1 to 4 carbon atoms and carbon in the aromatic ring may be replaced by nitrogen, p is an integer of from 1 to 18, m is an integer of from 1 to 36, n is 1 or 0, R$^5$ and R$^6$ are, independently of each other, hydrogen or —CH$_3$ wherein R$^5$ and R$^6$ may be the same or different from each other when a plurality of such groups are present, and R$^7$ is selected from hydrogen, a linear, branched or cyclic alkyl group having 1 to 18 carbon atoms, —Ph, —Pyr, —Ph—Ph, —Ph—Pyr, —CHO, —CH$_2$CHO, —CO—CH═CH$_2$ and —CO—C(CH$_3$)═CH$_2$, with the proviso that when R$^7$ is any other group than hydrogen, hydrogen bonded to carbon in R$^7$ may be replaced by a linear or branched alkyl group having 1 to 4 carbon atoms, —F, —Cl or —Br and carbon in the aromatic ring may be replaced by nitrogen, Ph denotes a phenyl or phenylene group, and Pyr denotes a pyridyl group.

Specific examples of the preferable unit structures making up the C segment and represented by the general formula (1) are mentioned below.

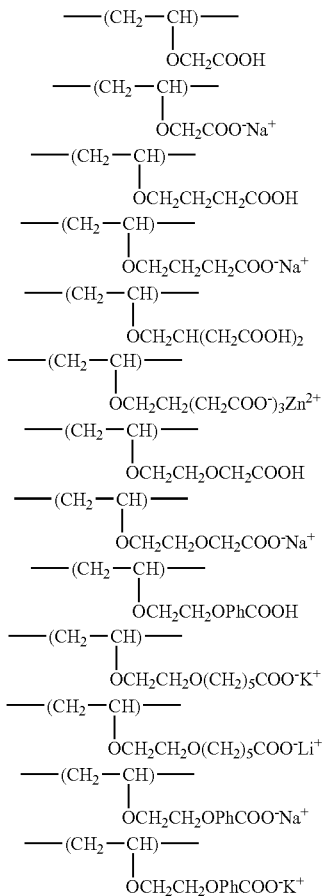

-continued

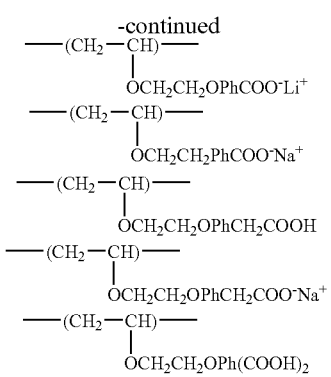

wherein Ph denotes a substituted benzene ring.

Specific examples of the preferable unit structures making up the A segment and represented by the general formula (2) include those mentioned below.

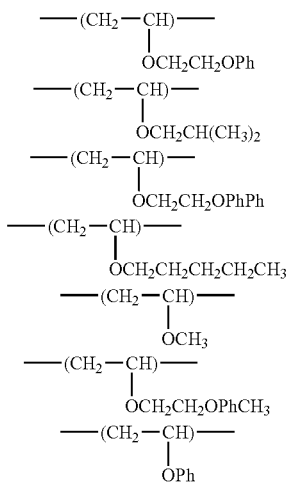

wherein Ph denotes a phenyl or phenylene group.

Specific examples of the preferable unit structures making up the B segment and represented by the general formula (2) include those mentioned below.

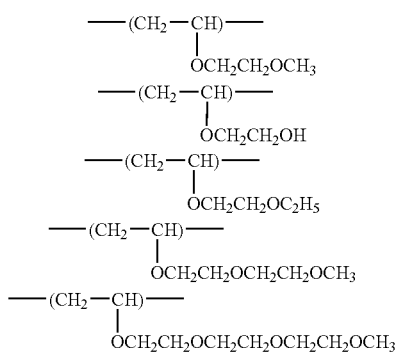

Many synthesizing processes for a polymer containing a polyvinyl ether structure have been reported (for example, Japanese Patent Application Laid-Open No. 11-080221). Processes using cationic living polymerization by Aoshima, et al. (Japanese Patent Application Laid-Open Nos. 11-322942 and 11-322866) are representative thereof. By conducting polymer synthesis according to the cationic living polymerization, various polymers such as homopolymers, copolymers composed of two or more monomers, block copolymers, graft polymers and graduation polymers can be synthesized with their chain lengths (molecular weights) made exactly uniform. Various functional groups may be introduced into side chains of polyvinyl ether. Besides, the living polymerization may also be conducted in an $HI/I_2$ system, $HCl/SnCl_4$ system or the like.

As described above, the block copolymer used in the present invention has an A segment that is a hydrophobic segment, a B segment that is an oxyethylene-structure-containing nonionic hydrophilic segment, and a C segment that is an ionic hydrophilic segment. The proportion of the A segment in the block copolymer is preferably 30 to 80 mol % based on the whole mass of the block copolymer, the proportion of the B segment is preferably 5 to 70 mol %, more preferably 5 to 40 mol %, and the proportion of the C segment is preferably 5 to 30 mol %.

In the present invention, preferable polymerization degrees of the respective segments are, independently of each other, from 3 to 10,000, more preferably from 5 to 5,000. The polymerization degrees of the A segment is preferably 30 to 120, the polymerization degrees of the B segment is preferably 5 to 160, while the polymerization degrees of the C segment is preferably 5 to 20.

On the other hand, the number of the oxyethylene structures contained in the B segment is preferably 1 to 4, particularly preferably 1 to 2.

The ratio of the number of unit structures of the A segment to the number of oxyethylene structures contained in the B segment (the number of unit structures of the A segment/the number of oxyethylene structures contained in the B segment) of the block copolymer is preferably 0.5 or more, more preferably 2 or less.

The ratio of the number of unit structures of the A segment to the number of oxyethylene structures contained in the B segment of the block copolymer contained in an ink composition relatively high in solid content concentration is preferably 1.1 times or more, particularly preferably 1.5 times or more as high as the ratio of the number of unit structures of the A segment to the number of oxyethylene structures contained in the B segment of the block copolymer contained in an ink composition relatively low in solid content concentration, and is preferably 5 times or less, particularly preferably 3 times or less.

In the present invention, any combination of the ink compositions making up the ink set requires that the ratio of the number of unit structures of the A segment to the number of oxyethylene structures contained in the B segment of the block copolymer contained in an ink composition relatively high in solid content concentration is higher than the ratio of the number of unit structures of the A segment to the number of oxyethylene structures contained in the B segment of the block copolymer contained in an ink composition-relatively low in solid content concentration so far as the difference between their solid content concentrations exceeds 2% by mass. In the present invention, the number of the oxyethylene structures contained in the B segment more preferably satisfies the constitution of the present invention even when the difference between the solid content concentrations is 2% by mass or less.

In the present invention, the content of the unit structures contained in the block copolymer and represented by the general formula (1) or (2) is within a range of preferably from 0.01 to 99 mol %, particularly preferably from 1 to 90 mol % based on the whole of the block copolymer. If the content is lower than 0.01 mol %, the interaction of the resulting polymer to be operated by the functional groups that the respective segments have may become insufficient in some cases. If the content exceeds 99 mol %, the interaction may overact on the contrary, and the function may become insufficient in some cases.

The number average molecular weight (Mn) of the block copolymer used in the present invention is within a range of preferably from 200 to 10,000,000, particularly preferably from 1,000 to 1,000,000. If the molecular weight exceeds 10,000,000, entanglement within a polymer chain and between polymer chains becomes too much, and so such a copolymer may be hard to be dispersed in a solvent. If the molecular weight is lower than 200, the molecular weight may be too low to exhibit a steric effect as a polymer.

In order to improve the dispersion stability and inclusion property of a pigment, the molecular motion of the block copolymer is preferably more flexible because such a block copolymer becomes easy to physically entangle with a surface of a functional substance and have affinity for it. The molecular motion is also preferably flexible even from the viewpoint of easily forming a coating layer on a recording medium, which will be subsequently described in detail. Therefore, the glass transition temperature Tg of the block copolymer is preferably 20° C. or lower, more preferably 0° C. or lower, still more preferably −20° C. or lower. In this regard, a block copolymer having a polyvinyl ether structure is preferably used because it generally has a low glass transition point and flexible properties. In the case of the examples of the unit structures mentioned above, their glass transition temperatures may be often about −20° C. or lower.

The block copolymers as the dispersants contained in the ink compositions according to the present invention may be used either singly or in any combination thereof. Further, publicly known dispersants may also be used in combination. The content of the dispersant contained in the ink composition according to the present invention is preferably 0.1 to 30% by mass, more preferably 0.5 to 10% by mass, still more preferably 0.5 to 6% by mass based on the total mass of the ink. If the content of the dispersant is higher than this range, it may be difficult in some cases to retain desired ink viscosity. If the content of the dispersant is lower than this range, it may be difficult in some cases to realize desired dispersibility. The ratio of the pigment to the block copolymer as the dispersant (pigment/block copolymer) is preferably 0.05 to 5, more preferably 1 to 3 by mass.

As the aqueous medium contained in the ink compositions according to the present invention, may be used that containing at least water. In addition, a solvent and a dispersing medium are contained, and a binder resin may also be used as the dispersing medium. As the solvent or dispersing medium, may be used a water-soluble organic solvent, a water-insoluble organic solvent or the like. It goes without saying that a mixture thereof may be used.

Examples of component materials used in combination with water include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol and n-pentanol; amides such as dimethylformamide and dimethylacetamide; ketones and ketone alcohols such as acetone and diacetone alcohol; ethers such as tetrahydrofuran and dioxane; copolymers of oxyethylene or oxypropylene, such as diethylene glycol, triethylene glycol, tetraethylene glycol, dipropylene glycol, tripropylene glycol, polyethylene glycol and polypropylene glycol; alkylene glycols the alkylene group of which has 2 to 6 carbon atoms, such as ethylene glycol, propylene glycol, trimethylene glycol, 1,4-butanediol and 1,5-pentanediol; triols such as 1,2,6-hexanetriol, glycerol and trimethylolpropane; lower alkyl ethers of glycol, such as ethylene glycol monomethyl (or monoethyl) ether, diethylene glycol monomethyl (or monoethyl) ether and triethylene glycol monomethyl (or monoethyl, monobutyl) ether; lower alkyl ethers of polyhydric alcohols, such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; 1,3-dimethyl-2-imidazolidinone; urea; ethyleneurea; and bishydroxyethyl sulfone. Among these, ethylene glycol, diethylene glycol, triethylene glycol, tetraethylene glycol, polyethylene glycol (average molecular weight: 200 to 1,000), 2-pyrrolidone, glycerol, 1,2,6-hexanetriol, ethyleneurea and trimethylolpropane may be preferably used, with glycerol being particularly preferred.

No particular limitation is imposed on the content of the component materials used in combination with water. However, it is preferably within a range of from 3% by mass to 60% by mass based on the whole mass of the ink.

Examples of the binder resin include styrene-acrylic copolymers and polyesters.

The content of the aqueous medium contained in the ink compositions according to the present invention is preferably within a range of from 30% by mass to 95% by mass based on the whole mass of the ink.

Besides the above components, for example, various kinds of surfactants, ultraviolet absorbents, stabilizers, antifoaming agents, antiseptics, mildewproofing agents, antioxidants, and the like may be added to the ink compositions according to the present invention, as needed, to provide them as inks having desired physical property values. The additives may preferably be selected in such a manner that the surface tension of the ink is 25 mN/m or higher, preferably 28 mN/m or higher.

As examples of a pigment that is an essential component in the present invention, carbon black is preferably used as a pigment used in a black ink. Examples of carbon black include carbon black pigments such as furnace black, lamp black, acetylene black and channel black. In particular, that having such properties that the primary particle size is 15 to 40 nm, the specific surface area as measured by the BET method is 50 to 300 $m^2/g$, the DBP oil absorption is 40 to 150 ml/100 g, and the volatile matter is 0.5 to 10% by mass is preferably used.

As pigments used in color inks, may be preferably used organic pigments. Specific examples thereof include insoluble azo pigments such as Toluidine Red, Toluidine Maroon, Hansa Yellow, Benzidine Yellow and Pyrazolone Red, soluble azo pigments such as Lithol Red, Helio Bordeaux, Pigment Scarlet and Permanent Red 2B, derivatives from vat dyes, such as alizarin, indanthron and Thioindigo Maroon, phthalocyanine pigments such as Phthalocyanine Blue and Phthalocyanine Green, quinacridone pigments such as Quinacridone Red and Quinacridone Magenta, perylene pigments such as Perylene Red and Perylene Scarlet, isoindolinone pigments such as Isoindolinone Yellow and Isoindolinone Orange, imidazolone pigments such as Benzimidazolone Yellow, Benzimidazolone Orange and Benzimidazolone Red, pyranthrone pigments such as Pyranthrone Red and Pyranthrone Orange, thioindigo pigments, condensed azo pigments, thioindigo pigments, diketopyrrolpyrrole pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red, Dioxazine Violet, etc. However, the organic pigments are not limited to these pigments.

When organic pigments are indicated by COLOR INDEX (C.I.) numbers, there may be exemplified C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185; C.I. Pigment Orange 16, 36, 43, 51, 55, 59, 61 and 71; C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. Pigment Violet 19, 23, 29, 30, 37, 40 and 50; C.I. Pigment Blue 15, 15:1, 15:3, 15:4, 15:6, 22, 60 and 64; C.I. Pigment Green 7 and 36; and C.I. Pigment Brown 23, 25 and 26. However, the organic pigments are not limited these pigments. Among these pigments, C.I. Pigment Yellow 13, 17, 55, 74, 93, 97, 98, 110, 128, 139, 147, 150, 151, 154, 155, 180 and 185, C.I. Pigment Red 122, 202 and 209, and C.I. Pigment Blue 15:3 and 15:4 are particularly preferred.

No particular limitation is imposed on the amount of these pigments added into the ink compositions. However, the amount is preferably within a range of from 0.1 to 50% by mass, more preferably from 0.5 to 30% by mass.

Although the materials making up the inks according to the present invention have been described above, the average particle size of a pigment dispersion according to the present invention is preferably within a range of from 50 to 200 nm. As for a method for measuring the average particle size, it may be measured by means of FPAR-1000 (trade name; manufactured by Otsuka Electronics Co., Ltd.) or the like.

The ink set for use in ink-jet recording of the present invention comprises the ink compositions of the combination as described above. The ink set preferably has at least a cyan ink composition, a magenta ink composition and a yellow ink composition.

The present invention also provides an ink-jet recording process that such an ink set as described above is used to conduct recording. The ink set may preferably be applied to a process that thermal energy is applied to an ink to conduct recording. In addition, the ink set may also preferably be applied to a process that the amount of an ink ejected per one ejection operation is 20 pl (picoliters) or less.

The recording apparatus according to the present invention will hereinafter be described taking an ink-jet printer as a specific example.

FIG. 1 is a schematic perspective view illustrating principal parts of a liquid-ejecting head as a liquid-ejecting head of an ejection system that a bubble is linked to the air upon ejection, and an exemplary ink-jet printer as a liquid-ejecting apparatus using this head.

In FIG. 1, the ink-jet printer comprises a conveying device 1030 for intermittently conveying paper 1028 as a recording medium provided along a longitudinal direction in a casing 1008 in a direction shown by an arrow P in FIG. 1, a recording part 1010 to be reciprocated in a substantially parallel direction along a guide rod 1014 in a direction S substantially perpendicular to the conveying direction P of the paper 1028 by the conveying device 1030, and a moving and driving part, 1006 as a driving means for reciprocating the recording part 1010.

The conveying device 1030 comprises a pair of roller units 1022a and 1022b and a pair of roller units 1024a and 1024b arranged in substantial parallel with and in opposed relation to each other, and a driving part 1020 for driving these respective roller units. By this construction, the paper 1028 is intermittently conveyed while being held between the respective roller units 1022a and 1022b and the roller units 1024a and 1024b in a direction shown by the arrow P in FIG. 1 when the driving part 1020 of the conveying device 1030 is operated. The moving and driving part 1006 comprises a belt 1016 wound around pulleys 1026a and 1026b respectively provided on rotating shafts oppositely arranged at a prescribed interval, and a motor 1018 for driving in forward and reverse directions the belt 1016 joined to a carriage member 1010a of the recording part 1010 arranged in substantially parallel to the roller units 1022a and 1022b.

When the motor 1018 is operated to rotate the belt 1016 in a direction shown by an arrow R in FIG. 1, the carriage member 1010a of the recording part 1010 is moved by the prescribed movement in the direction shown by the arrow S in FIG. 1. When the motor 1018 is operated to rotate the belt 1016 in a direction reverse to the direction shown by the arrow R in FIG. 1, the carriage member 1010a of the recording part 1010 is moved by the prescribed movement in a direction reverse to the direction shown by the arrow S in FIG. 1. At an end of the moving and driving part 1006, a recovery unit 1026 for conducting an ejection-recovery operation for the recording part 1010 is provided in opposed relation to an array of ink-ejection openings of the recording part 1010 at the home position of the carriage member 1010a.

In the recording part 1010, ink-jet cartridges (hereinafter may be referred to merely as "cartridges" in some cases) 1012Y, 1012M, 1012C and 1012B for respective colors, for example, yellow, magenta, cyan and black, are detachably mounted on a carriage member 1010a.

Figure 2:
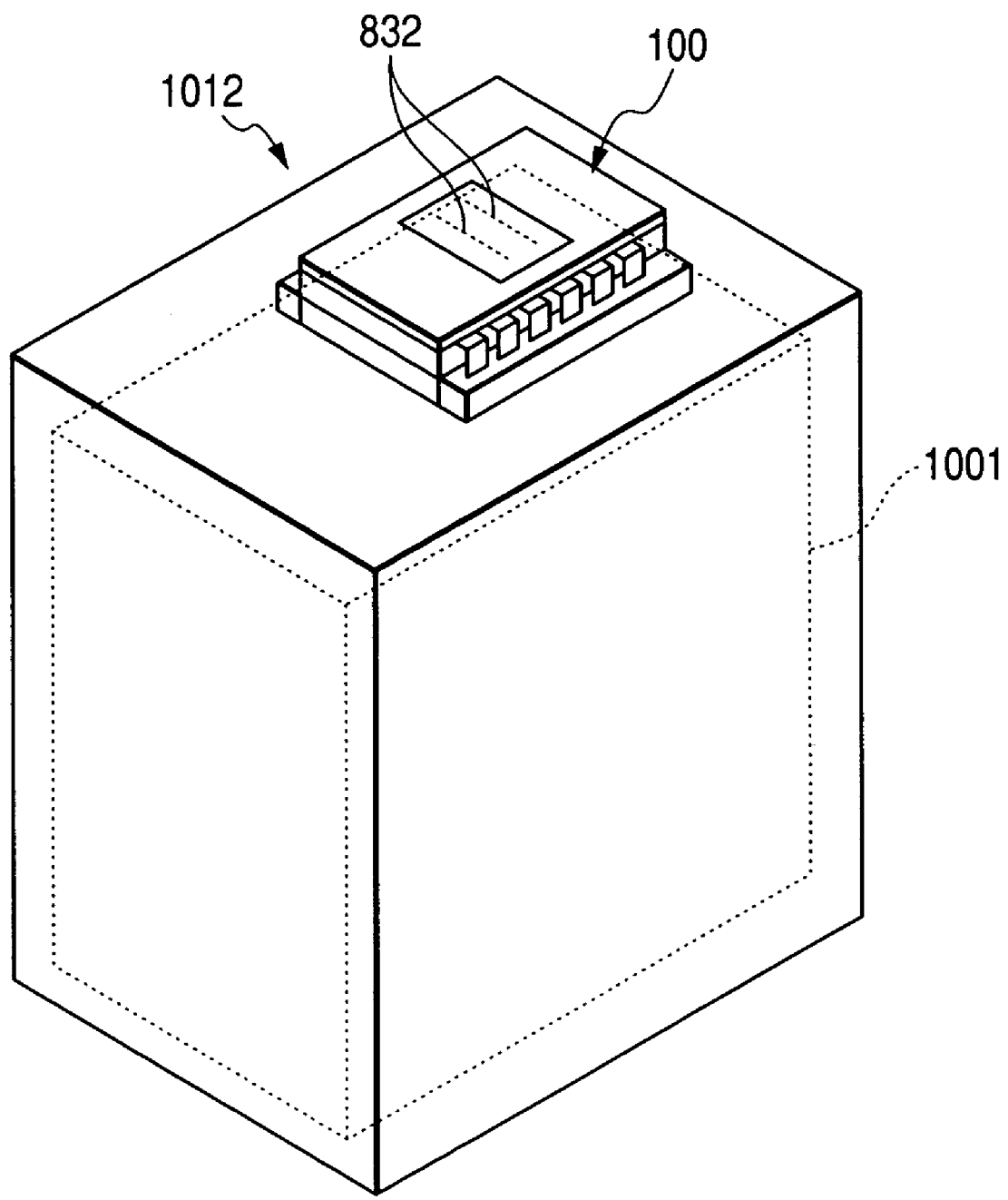
FIG. 2 is a schematic perspective view illustrating an exemplary ink-jet cartridge equipped with a liquid-ejecting head.

FIG. 2 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 as an ink containing portion for containing a liquid such as an ink.

In the ink-jet recording head 100, a great number of ejection openings 832 for ejecting the liquid are formed, and the liquid such as an ink is directed to a common liquid chamber (not illustrated) in the liquid-ejecting head 100 through a liquid feed passage (not illustrated) from the liquid tank 1001. The ink-jet recording head is preferably equipped with a heater for applying thermal energy. The cartridge 1012 illustrated in FIG. 2 is so constructed that the ink-jet recording head 100 and the liquid tank 1001 are integrally formed, and the liquid can be supplied to the interior of the liquid tank 1001 as needed. However, such a structure that the liquid tank 1001 is replaceably joined to this liquid-ejecting head 100 may also be employed.

Incidentally, an ink-jet cartridge equipped with an ink-jet recording head is a recording unit.

The present invention will hereinafter be described in detail by the following examples. However, the present invention is not limited to these examples.

<Synthesis of Block Copolymer>

As an A segment, was used a random copolymer (A1; copolymerization unit ratio: 46/45) of biphenylethyl vinyl ether and isobutyl vinyl ether, an isobutyl vinyl ether polymer (A2) or a 4-methylphenoxyethyl vinyl ether polymer (A3). As a B segment, was used a 2-(2-methoxyethyloxy)ethyl vinyl ether polymer (B1) or a 2-(2-(2-methoxyethyloxy)ethyloxy) ethyl vinyl ether polymer (B2). As a C segment, was used a 4-(2-vinyloxy)-ethoxybenzoic acid polymer (C1) or a 5-(2-vinyloxy)ethoxy-1,3-phthalic acid polymer (C2). Triblock copolymers of 12 kinds in total, in which the combination of the respective segments and the number of unit structures in each segment were changed, were synthesized by living cationic polymerization using an aluminum catalyst, thereby obtaining the following block copolymers (see Table 1).

Specifically, after the interior of a glass container equipped with a three-way stop-cock was purged with nitrogen, the container was heated to 250° C. under a nitrogen gas atmosphere to remove adsorbed water. After the system was returned to room temperature, a monomer, which will become unit structure(s) of the A segment, was added to 16 mmol of ethyl acetate, 0.05 mmol of 1-isobutoxyethyl acetate and 11 ml of toluene, and the reaction system was cooled. At the time the temperature within the system had reached 0° C., 0.2 mmol of ethylaluminum sesquichloride (equimolar mixture of diethylaluminum chloride and ethylaluminum chloride) was added to initiate polymerization. The molecular weight was periodically monitored by means of gel permeation chromatography (GPC) to confirm completion of the polymerization of the monomer to become the unit structure(s) of the A segment.

A monomer, which will become unit structure(s) of the B segment, was then added to continue the polymerization. Completion of the polymerization of the monomer to become the unit structure(s) of the B segment was confirmed by monitoring by means of GPC. Thereafter, a toluene solution of a monomer, which will become unit structure(s) in which a carboxylic acid moiety in unit structures of the C segment has been esterified, was added to continue the polymerization. After 20 hours, the polymerization reaction was terminated. The termination of the polymerization reaction was conducted by adding a 0.3% by mass aqueous solution of ammonia/methanol into the system. The reaction mixture solution was diluted with dichloromethane and washed 3 times with 0.6 M hydrochloric acid and then 3 times with distilled water. The resultant organic phase was concentrated and dried to solids by an evaporator and then vacuum-dried. The resultant product was dialyzed repeatedly in a methanol solvent using a semi-permeable membrane composed of cellulose to remove monomeric compounds, thereby obtaining the intended triblock polymer. The identification of the compound was conducted by means of NMR and GPC.

The block polymer obtained above was hydrolyzed in a mixed solution of dimethylformamide and aqueous sodium hydroxide, thereby hydrolyzing the ester moiety of the C segment to obtain a triblock polymer in a form of a sodium salt. The identification of the compound was conducted by means of NMR and GPC.

This polymer was further neutralized with 0.1N hydrochloric acid in an aqueous dispersion to obtain a triblock polymer, in which the sodium salt portion in the C segment turned into a free carboxylic acid. The identification of the compound was conducted by means of NMR and GPC.

Incidentally, the ratio of the number of unit structures of the A segment to the number of oxyethylene structures contained in the B segment is indicated as "A/EO".

TABLE 1

| Co-polymer | A segment A1 | A2 | A3 | B segment B1 | B2 | C segment C1 | C2 | Mn | Mw/Mn | A/EO |
|---|---|---|---|---|---|---|---|---|---|---|
| P1 | 91 | | | 88 | | 17 | | 26800 | 1.24 | 0.52 |
| P2 | 91 | | | 84 | | 15 | | 27200 | 1.23 | 0.54 |
| P3 | | 110 | | 42 | | 16 | | 19700 | 1.24 | 1.31 |
| P4 | | | 98 | 30 | | 15 | | 20400 | 1.20 | 1.63 |
| P5 | | | 88 | 35 | | | 12 | 20800 | 1.15 | 1.26 |
| P6 | | | 90 | 40 | | 22 | | 23100 | 1.15 | 1.13 |
| P7 | | | 87 | 41 | | | 12 | 21900 | 1.12 | 1.06 |
| P8 | | | 88 | 47 | | | 15 | 21800 | 1.16 | 0.94 |
| P9 | | | 44 | 40 | | 17 | | 15100 | 1.23 | 0.55 |
| P10 | | | 86 | 84 | | 23 | | 26000 | 1.22 | 0.51 |
| P11 | | | 86 | | 78 | 14 | | 24600 | 1.27 | 0.37 |
| P12 | | | 89 | | 154 | 10 | | 30200 | 1.50 | 0.19 |

EXAMPLE 1

Ten parts by mass of the block polymer P9 described above and 10 parts by mass of C.I. Pigment Blue 15:3 were dissolved in 90 parts by mass of dimethylformamide, and the resultant solution was converted into a water phase with 100 parts by mass of distilled water to obtain a pigment dispersion. Coarse particles in the pigment dispersion were then removed by means of a membrane filter having a pore size of 2 μm, and then water, glycerol, ethyleneurea, 2-pyrrolidone, 1,2,6-hexanetriol and Acetylenol EH (trade name, product of Kawaken Fine Chemicals Co., Ltd.) were added so as to give a final solid content concentration of 5.0% by mass, thereby preparing a cyan ink. Proportions of glycerol, ethyleneurea, 2-pyrrolidone, 1,2,6-hexanetriol and Acetylenol EH in the ink were controlled to 7% by mass, 2% by mass, 3% by mass, 5% by mass and 0.3% by mass, respectively.

The block polymer P8 described above and C.I. Pigment Red 122, the block polymer P5 described above and C.I. Pigment Yellow 128, and the block polymer P6 described above and C.I. Pigment Black 7 were respectively used to prepare pigment dispersions in accordance with the above-described procedure. After coarse particles in the pigment dispersions were removed by means of a membrane filter having a pore size of 2 μm, water, glycerol, ethyleneurea, 2-pyrrolidone, 1,2,6-hexanetriol and Acetylenol EH were added so as to give final solid content concentrations of 7.0% by mass, 9.0% by mass and 8.0% by mass, respectively, thereby preparing magenta, yellow and black inks. Proportions of glycerol, ethyleneurea, 2-pyrrolidone, 1,2,6-hexanetriol and Acetylenol EH in each ink were controlled to 7% by mass, 2% by mass, 3% by mass, 5% by mass and 0.3% by mass, respectively. An ink set composed of these 4 kinds of inks was referred to as Ink Set 1 (see Table 2).

TABLE 2

| Ink Set 1 | Copolymer | Pigment | Solid content concentration | A/EO |
|---|---|---|---|---|
| Cyan | P9 | C.I. Pigment Blue 15:3 | 5.0% by mass | 0.55 |
| Magenta | P8 | C.I. Pigment Red 122 | 7.0% by mass | 0.94 |
| Yellow | P5 | C.I. Pigment Yellow 128 | 9.0% by mass | 1.26 |
| Black | P6 | C.I. Pigment Black 7 | 8.0% by mass | 1.13 |

EXAMPLE 2

Combinations composed of the block polymer P1 described above and C.I. Pigment Blue 15:4, the block polymer P7 described above and C.I. Pigment Red 122, the block polymer P4 described above and C.I. Pigment Yellow 128, and the block polymer P3 described above and C.I. Pigment Black 7, respectively, were used to prepare pigment dispersions in accordance with the above-described procedure. After coarse particles in the pigment dispersions were removed by means of a membrane filter having a pore size of 2 μm, water, glycerol, trimethylolpropane, ethyleneurea and Acetylenol EH (trade name, product of Kawaken Fine Chemicals Co., Ltd.) were added so as to give final solid content concentrations of 5.0% by mass, 7.0% by mass, 9.0% by mass and 8.0% by mass, respectively, thereby preparing cyan, magenta, yellow and black inks. Proportions of glycerol, trimethylolpropane, ethyleneurea and Acetylenol EH in each ink were controlled to 7% by mass, 8% by mass, 2% by mass and 0.5% by mass, respectively. An ink set composed of these 4 kinds of inks was referred to as Ink Set 2 (see Table 3).

TABLE 3

| Ink Set 1 | Co-polymer | Pigment | Solid content concentration | A/EO |
|---|---|---|---|---|
| Cyan | P1 | C.I. Pigment Blue 15:4 | 5.0% by mass | 0.52 |
| Magenta | P7 | C.I. Pigment Red 122 | 7.0% by mass | 1.06 |
| Yellow | P4 | C.I. Pigment Yellow 128 | 9.0% by mass | 1.63 |
| Black | P3 | C.I. Pigment Black 7 | 8.0% by mass | 1.31 |

EXAMPLE 3

The block polymer P6 described above was used to prepare pigment dispersions respectively containing C.I. Pigment Blue 15:3 and C.I. Pigment Red 122 in accordance with the above-described procedure. The block polymer P3 described above was used to prepare pigment dispersions respectively containing C.I. Pigment Yellow 128 and C.I. Pigment Black 7 in accordance with the above-described procedure. Coarse particles in these pigment dispersions were removed by means of a membrane filter having a pore size of 2 μm, and water, glycerol, trimethylolpropane, ethyleneurea and Acetylenol EH (trade name, product of Kawaken Fine Chemicals Co., Ltd.) were then added so as to give final solid content concentrations of 5.0% by mass, 7.0% by mass, 9.0% by mass and 8.0% by mass, respectively, thereby preparing cyan, magenta, yellow and black inks. Proportions of glycerol, trimethylolpropane, ethyleneurea and Acetylenol EH in each ink were controlled to 7% by mass, 8% by mass, 2% by mass and 0.5% by mass, respectively.

After the block polymer P10 described above was used to prepare pigment dispersions respectively containing C.I. Pigment Blue 15:3 and C.I. Pigment Red 122 in accordance with the above-described procedure, and coarse particles in these pigment dispersions were removed by means of a membrane filter having a pore size of 2 μm, water, glycerol, trimethylolpropane, ethyleneurea and 0.5% by mass of Acetylenol EH (trade name, product of Kawaken Fine Chemicals Co., Ltd.) were added so as to give final solid content concentrations of 1.0% by mass and 1.4% by mass, respectively, thereby preparing light cyan and light magenta inks. Proportions of glycerol, trimethylolpropane, ethyleneurea and Acetylenol EH in each ink were controlled to 7% by mass, 8% by mass, 2% by mass and 0.5% by mass, respectively. These light inks and the above-prepared 4 inks were combined to prepare Ink Set 3 composed of 6 kinds of inks (see Table 4).

TABLE 4

| Ink Set 3 | Co-polymer | Pigment | Solid content concentration | A/EO |
|---|---|---|---|---|
| Cyan | P6 | C.I. Pigment Blue 15:3 | 5.0% by mass | 1.13 |
| Magenta | P6 | C.I. Pigment Red 122 | 7.0% by mass | 1.13 |

TABLE 4-continued

| Ink Set 3 | Co-polymer | Pigment | Solid content concentration | A/EO |
|---|---|---|---|---|
| Yellow | P3 | C.I. Pigment Yellow 128 | 9.0% by mass | 1.31 |
| Black | P3 | C.I. Pigment Black 7 | 8.0% by mass | 1.31 |
| Light cyan | P10 | C.I. Pigment Blue 15:3 | 1.0% by mass | 0.51 |
| Light magenta | P10 | C.I. Pigment Red 122 | 1.4% by mass | 0.51 |

EXAMPLE 4

The block polymer P7 described above was used to prepare pigment dispersions respectively containing C.I. Pigment Blue 15:3 and C.I. Pigment Red 122 in accordance with the above-described procedure. The block polymer P4 described above was used to prepare pigment dispersions respectively containing C.I. Pigment Yellow 74 and C.I. Pigment Black 7 in the same manner as described above. Further, the block polymer P1 described above was used to prepare pigment dispersions respectively containing C.I. Pigment Blue 15:3 and C.I. Pigment Red 122 in the same manner as described above. Coarse particles in the pigment dispersions thus prepared were removed by means of a membrane filter having a pore size of 2 μm. Thereafter, water, glycerol, trimethylolpropane, ethyleneurea and Acetylenol EH (trade name, product of Kawaken Fine Chemicals Co., Ltd.) were then added so as to give final solid content concentrations of 5.0% by mass, 7.0% by mass, 9.0% by mass, 8.0% by mass, 1.0% by mass and 1.4% by mass, respectively, thereby preparing cyan, magenta, yellow, black, light cyan and light magenta inks. Proportions of glycerol, trimethylolpropane, ethyleneurea and Acetylenol EH in each ink were controlled to 7% by mass, 8% by mass, 2% by mass and 0.5% by mass, respectively. An ink set composed of these 6 kinds of inks is referred to as Ink Set 4 (see Table 5).

TABLE 5

| Ink Set 4 | Co-polymer | Pigment | Solid content concentration | A/EO |
|---|---|---|---|---|
| Cyan | P7 | C.I. Pigment Blue 15:3 | 5.0% by mass | 1.06 |
| Magenta | P7 | C.I. Pigment Red 122 | 7.0% by mass | 1.06 |
| Yellow | P4 | C.I. Pigment Yellow 128 | 9.0% by mass | 1.63 |
| Black | P4 | C.I. Pigment Black 7 | 8.0% by mass | 1.63 |
| Light cyan | P1 | C.I. Pigment Blue 15:3 | 1.0% by mass | 0.52 |
| Light magenta | P1 | C.I. Pigment Red 122 | 1.4% by mass | 0.52 |

EXAMPLE 5

Respective combinations of the block polymer P8 described above and C.I. Pigment Blue 15:3, the block polymer P7 described above and C.I. Pigment Red 122, the block polymer P3 described above and C.I. Pigment Yellow 128, and the Block polymer P5 described above and C.I. Pigment Black 7 were used to prepare pigment dispersions in accordance with the above-described procedure. Further, combinations of the block polymer P11 described above and C.I. Pigment Blue 15:3, and the block polymer P2 described above and C.I. Pigment Red 122 were used to prepare pigment dispersions in the same manner as described above. Coarse particles in the pigment dispersions thus prepared were removed by means of a membrane filter having a pore size of 2 μm. Thereafter, water, glycerol, trimethylolpropane, ethyleneurea and Acetylenol EH (trade name, product of Kawaken Fine Chemicals Co., Ltd.) were then added so as to give final solid content concentrations of 5.0% by mass, 7.0% by mass, 9.0% by mass, 8.0% by mass, 1.0% by mass and 1.4% by mass, respectively, thereby preparing cyan, magenta, yellow, black, light cyan and light magenta inks. Proportions of glycerol, trimethylolpropane, ethyleneurea and Acetylenol EH in each ink were controlled to 7% by mass, 8% by mass, 2% by mass and 0.5% by mass, respectively. An ink set composed of these 6 kinds of inks is referred to as Ink Set 5 (see Table 6).

TABLE 6

| Ink Set 5 | Co-polymer | Pigment | Solid content concentration | A/EO |
|---|---|---|---|---|
| Cyan | P8 | C.I. Pigment Blue 15:3 | 5.0% by mass | 0.94 |
| Magenta | P7 | C.I. Pigment Red 122 | 7.0% by mass | 1.06 |
| Yellow | P3 | C.I. Pigment Yellow 128 | 9.0% by mass | 1.31 |
| Black | P5 | C.I. Pigment Black 7 | 8.0% by mass | 1.26 |
| Light cyan | P11 | C.I. Pigment Blue 15:3 | 1.0% by mass | 0.37 |
| Light magenta | P2 | C.I. Pigment Red 122 | 1.4% by mass | 0.54 |

COMPARATIVE EXAMPLE 1

The block copolymer P12 described above was used to prepare pigment dispersions respectively containing C.I. Pigment Blue 15:3, C.I. Pigment Red 122, C.I. Pigment Yellow 128 and C.I. Pigment Black 7 in the same manner as described above. After coarse particles were removed by means of a membrane filter having a pore size of 2 μm, water, glycerol, trimethylolpropane, ethyleneurea and Acetylenol EH (trade name, product of Kawaken Fine Chemicals Co., Ltd.) were then added so as to give final solid content concentrations of 5.0% by mass, 7.0% by mass, 9.0% by mass and 8.0% by mass, respectively, thereby preparing cyan, magenta, yellow and black inks. Proportions of glycerol, trimethylolpropane, ethyleneurea and Acetylenol EH in each ink were controlled to 7% by mass, 8% by mass, 2% by mass and 0.5% by mass, respectively. An ink set composed of these 4 kinds of inks is referred to as Ink Set 6 (see Table 7).

TABLE 7

| Ink Set 6 | Co-polymer | Pigment | Solid content concentration | A/EO |
|---|---|---|---|---|
| Cyan | P12 | C.I. Pigment Blue 15:3 | 5.0% by mass | 0.19 |
| Magenta | P12 | C.I. Pigment Red 122 | 7.0% by mass | 0.19 |
| Yellow | P12 | C.I. Pigment Yellow 128 | 9.0% by mass | 0.19 |
| Black | P12 | C.I. Pigment Black 7 | 8.0% by mass | 0.19 |

COMPARATIVE EXAMPLE 2

Respective combinations of the block polymer P4 described above and C.I. Pigment Blue 15:3, the block polymer P3 described above and C.I. Pigment Red 122, the block polymer P2 described above and C.I. Pigment Yellow 128, and the block polymer P1 described above and C.I. Pigment Black 7 were used to prepare pigment dispersions in accordance with the above-described procedure. After coarse particles were removed by means of a membrane filter having a pore size of 2 μm, water, glycerol, ethyleneurea, 2-pyrrolidone, 1,2,6-hexanetriol and Acetylenol EH (trade name, product of Kawaken Fine Chemicals Co., Ltd.) were added so as to give concentrations of 5.0% by mass, 7.0% by mass, 9.0% by mass and 8.0% by mass, respectively, thereby preparing cyan, magenta, yellow and black inks. Proportions of glycerol, ethyleneurea, 2-pyrrolidone, 1,2,6-hexanetriol and Acetylenol EH in each ink were controlled to 7% by mass, 2% by mass, 3% by mass, 5% by mass and 0.3% by mass, respectively. An ink set composed of these 4 kinds of inks was referred to as Ink Set 7 (see Table 8).

TABLE 8

| Ink Set 7 | Co-polymer | Pigment | Solid content concentration | A/EO |
|---|---|---|---|---|
| Cyan | P4 | C.I. Pigment Blue 15:3 | 5.0% by mass | 1.63 |
| Magenta | P3 | C.I. Pigment Red 122 | 7.0% by mass | 1.31 |
| Yellow | P2 | C.I. Pigment Yellow 128 | 9.0% by mass | 0.54 |
| Black | P1 | C.I. Pigment Black 7 | 8.0% by mass | 0.52 |

COMPARATIVE EXAMPLE 3

Respective combinations of the block polymer P11 described above and C.I. Pigment Blue 15:3, the block polymer P1 described above and C.I. Pigment Red 122, the block polymer P9 described above and C.I. Pigment Yellow 128, and the block polymer P5 described above and C.I. Pigment Black 7 were used to prepare pigment dispersions in accordance with the above-described procedure. Further, combinations of the block polymer P11 described above and C.I. Pigment Blue 15:3, and the block polymer P2 described above and C.I. Pigment Red 122 were used to prepare pigment dispersions in the same manner as described above. Coarse particles in the pigment dispersions thus prepared were removed by means of a membrane filter having a pore size of 2 μm. Thereafter, water, glycerol, trimethylolpropane, ethyleneurea and Acetylenol EH (trade name, product of Kawaken Fine Chemicals Co., Ltd.) were then added so as to give final solid content concentrations of 5.0% by mass, 7.0% by mass, 9.0% by mass, 8.0% by mass, 1.0% by mass and 1.4% by mass, respectively, thereby preparing cyan, magenta, yellow, black, light cyan and light magenta inks. Proportions of glycerol, trimethylolpropane, ethyleneurea and Acetylenol EH in each ink were controlled to 7% by mass, 8% by mass, 2% by mass and 0.5% by mass, respectively. An ink set composed of these 6 kinds of inks is referred to as Ink Set 8 (see Table 9).

TABLE 9

| Ink Set 8 | Co-polymer | Pigment | Solid content concentration | A/EO |
|---|---|---|---|---|
| Cyan | P11 | C.I. Pigment Blue 15:3 | 5.0% by mass | 0.37 |
| Magenta | P1 | C.I. Pigment Red 122 | 7.0% by mass | 1.52 |
| Yellow | P9 | C.I. Pigment Yellow 128 | 9.0% by mass | 0.55 |
| Black | P5 | C.I. Pigment Black 7 | 8.0% by mass | 1.26 |
| Light cyan | P11 | C.I. Pigment Blue 15:3 | 1.0% by mass | 0.37 |
| Light magenta | P2 | C.I. Pigment Red 122 | 1.4% by mass | 0.54 |

<Evaluation of Ink Sets>

With respect to all the ink sets prepared above, evaluation as to color unevenness, abrasion resistance, water fastness and glossiness was conducted in the following manner. The evaluation was conducted on images obtained by installing each ink set in an ink-jet printer, BJF 930 (trade name, manufactured by Canon Inc.) and conducting printing on Professional Photo Paper, PR-101 (trade name; product of Canon Inc.) under predetermined conditions.

[Evaluation as to Color Unevenness]

The respective inks of black, cyan, yellow, magenta, light magenta (only Examples 3, 4 and 5 and Comparative Example 3) and light cyan (only Examples 3, 4 and 5 and Comparative Example 3) were used to print solid patches (5×5 cm) of 100% duty, respectively, thereby visually observing whether color unevenness occurred or not.

Rank A: No color unevenness was observed.
Rank B: Some color unevenness occurred.
Rank C: Color unevenness markedly occurred.

In the printed samples of Ranks B and C, stripe-like color unevenness occurred on the side of the beginning of the printing. The results are shown in Table 10.

TABLE 10

| | Ink Set | Cyan | Magenta | Yellow | Black | Light cyan | Light magenta |
|---|---|---|---|---|---|---|---|
| Ex. 1 | 1 | A | A | A | A | — | — |
| Ex. 2 | 2 | A | A | A | A | — | — |
| Ex. 3 | 3 | A | A | A | A | A | A |
| Ex. 4 | 4 | A | A | A | A | A | A |
| Ex. 5 | 5 | A | A | A | A | A | A |
| Comp. Ex. 1 | 6 | A | C | C | B | — | — |
| Comp. Ex. 2 | 7 | A | B | C | B | — | — |
| Comp. Ex. 3 | 8 | A | C | C | B | A | A |

[Evaluation as to Abrasion Resistance]

Solid printing was conducted in the same manner as in the evaluation as to the color unevenness, and the resultant images were rubbed with a finger right after completion of the printing to make evaluation as to abrasion resistance. Each sample was ranked as "A" where the images of all the colors were not messed up when rubbed with the finger, or "C" where the image of at least one color was messed up when rubbed with the finger. The results are shown in Table 11.

(Evaluation as to Water Fastness)

Solid printing was conducted in the same manner as in the evaluation as to the color unevenness, and water was dropped on the resultant samples right after completion of the printing to make evaluation as to water fastness. Each sample was ranked as "A" where the images of all the colors were not blurred, or "C" where the image of at least one color was blurred. The results are shown in Table 11.

(Evaluation as to Glossiness)

Photo-images for evaluation of glossiness were printed by 4 passes, and the 20'-gloss of the resultant images was measured by means of a specular gloss meter (manufactured by Murakami Color Research Laboratory Co. Ltd.) to judge the glossiness in accordance with the following standard. The results are shown in Table 11.

AA: Not lower than 50;
A: Not lower than 40, but lower than 50;
B: Not lower than 30, but lower than 40;
C: Lower than 30.

TABLE 11

| | Ink Set | Abrasion resistance | Water fastness | Glossiness |
|---|---|---|---|---|
| Ex. 1 | 1 | A | A | A |
| Ex. 2 | 2 | A | A | A |
| Ex. 3 | 3 | A | A | AA |
| Ex. 4 | 4 | A | A | AA |
| Ex. 5 | 5 | A | A | AA |
| Comp. Ex. 1 | 6 | A | A | A |
| Comp. Ex. 2 | 7 | A | A | B |
| Comp. Ex. 3 | 8 | A | A | B |

This application claims priority from Japanese Patent Application No. 2004-258696 filed on Sep. 6, 2004, which is hereby incorporated by reference herein.

What is claimed is:

1. An ink set for use in ink-jet recording comprising at least 2 ink compositions having solid content concentrations which are different by more than 2% by mass,
wherein said at least 2 ink compositions each comprise an aqueous medium, a pigment and a dispersant for dispersing the pigment, and the dispersant is a block copolymer having an A segment that is a hydrophobic segment, a B segment that is an oxyethylene-structure-containing nonionic hydrophilic segment, and a C segment that is an ionic hydrophilic segment, and
wherein the ratio of the number of unit structures of the A segment to the number of oxyethylene structures contained in the B segment of the block copolymer contained in each of said at least 2 ink compositions is higher in the block copolymer contained in the ink composition having a relatively high solid content concentration than in the block copolymer contained in the ink composition having a relatively low solid content concentration.

2. The ink set according to claim 1, wherein said at least 2 ink compositions are ink compositions of the same color.

3. The ink set according to claim 1, which comprises a cyan ink composition, a magenta ink composition and a yellow ink composition.

4. The ink set according to claim 1, wherein the block copolymer has a polyvinyl ether structure as a unit structure.

5. The ink set according to claim 4, wherein the C segment has a unit structure represented by the following general formula (1):

(1)

wherein $R^0$ is —X—(COOH)$_r$, —X—(COO—M)$_r$ or —X—(COO)$_2$M$^2$, X is a linear, branched or cyclic alkanediyl or alkanetriyl group having 1 to 20 carbon atoms, or —(CH(R$^5$)—CH(R$^6$)—O)$_p$—(CH$_2$)$_m$—CH$_{3-r}$—, —(CH$_2$)$_m$—(O)$_n$—(CH$_2$)$_q$—CH$_{3-r}$—, or a group obtained by substituting a carbonyl group or an aromatic ring structure for at least one of the methylene groups thereof or a group obtained by substituting an aromatic ring structure for at least one of the methine groups thereof, r is 1 or 2, p is an integer of from 1 to 18, m is an integer of from 0 to 35, n is 1 or 0, q is an integer of from 0 to 17, M is a monovalent cation, M$^2$ is a divalent cation, and $R^5$ and $R^6$ are alkyl groups and may be the same or different from each other wherein the $R^5$ or $R^6$ groups may be the same or different from each other when a plurality of such groups are present.

6. The ink set according to claim 4, wherein at least one of the A segment or B segment has a unit structure represented by the following general formula (2):

wherein $R^1$ is selected from a linear, branched or cyclic alkyl group having 1 to 18 carbon atoms, —Ph, —Pyr, —Ph—Ph, —Ph—Pyr, —(CH($R^5$)—CH($R^5$)—O)$_p$—$R^7$ and —(CH$_2$)$_m$—(O)$_n$—$R^7$, in which hydrogen bonded to carbon in the aromatic ring may be replaced by a linear or branched alkyl group having 1 to 4 carbon atoms and carbon in the aromatic ring may be replaced by nitrogen, p is an integer of from 1 to 18, m is an integer of from 1 to 36, n is 1 or 0, $R^5$ and $R^6$ are, independently of each other, hydrogen or —CH$_3$ wherein $R^5$ and $R^6$ may be the same or different from each other when a plurality of such groups are present, and $R^7$ is selected from hydrogen, a linear, branched or cyclic alkyl group having 1 to 18 carbon atoms, —Ph, —Pyr, —Ph—Ph, —Ph—Pyr, —CHO, —CH$_2$CHO, —CO—CH=CH$_2$ and —CO—C(CH$_3$)=CH$_2$, with the proviso that when $R^7$ is any other group than hydrogen, hydrogen bonded to carbon in $R^7$ may be replaced by a linear or branched alkyl group having 1 to 4 carbon atoms, —F, —Cl or —Br and carbon in the aromatic ring may be replaced by nitrogen, Ph denotes a phenyl or phenylene group, and Pyr denotes a pyridyl group.

7. An ink-jet recording process comprising the steps of:
providing an ink set comprising at least 2 ink compositions having solid content concentrations which are different by more than 2% by mass, wherein said at least 2 ink compositions each comprise an aqueous medium, a pigment and a dispersant for dispersing the pigment, and the dispersant is a block copolymer having an A segment that is a hydrophobic segment, a B segment that is an oxyethylene-structure-containing nonionic hydrophilic segment, and a C segment that is an ionic hydrophilic segment, and wherein the ratio of the number of unit structures of the A segment to the number of oxyethylene structures contained in the B segment of the block copolymer contained in each of said at least 2 ink compositions is higher in the block copolymer contained in the ink composition having a relatively high solid content concentration than in the block copolymer contained in the ink composition having a relatively low solid content concentration; and conducting recording with the ink set.

8. The ink-jet recording process according to claim 7, further comprising the step of applying thermal energy to the ink compositions.

9. The ink-jet recording process according to claim 7, further comprising the step of ejection the ink compositions wherein each ejection ejects an ink ejection amount of 20 picoliters or less.

10. An ink cartridge comprising an ink-storing portion for containing the ink set according to claim 1.

11. A recording unit comprising an ink cartridge having an ink-storing portion containing the ink set according to claim 1, and an ink-jet recording head for ejecting the ink set.

12. The recording unit according to claim 11, wherein the ink-jet recording head includes a heater for applying thermal energy.

13. A recording apparatus comprising the recording unit according to claim 11.

* * * * *